(12) United States Patent
Park et al.

(10) Patent No.: US 9,524,748 B2
(45) Date of Patent: Dec. 20, 2016

(54) SYSTEMS AND METHODS FOR MULTI-DIMENSIONAL EQUALIZATION CONSTRAINT

(71) Applicant: Avago Technologies General IP (Singapore) Pte. Ltd., Singapore (SG)

(72) Inventors: Jongseung Park, Allentown, PA (US); George Mathew, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 27 days.

(21) Appl. No.: 14/563,919

(22) Filed: Dec. 8, 2014

(65) Prior Publication Data

US 2016/0163352 A1    Jun. 9, 2016

(51) Int. Cl.
*G11B 5/035* (2006.01)
*G11B 20/10* (2006.01)
*G11B 5/09* (2006.01)

(52) U.S. Cl.
CPC ... *G11B 20/10046* (2013.01); *G11B 20/10009* (2013.01); *G11B 5/035* (2013.01); *G11B 5/09* (2013.01); *G11B 20/10055* (2013.01)

(58) Field of Classification Search
None
See application file for complete search history.

(56) References Cited

U.S. PATENT DOCUMENTS

| | | | |
|---|---|---|---|
| 5,488,591 A * | 1/1996 | Kobayashi et al. | 369/13.02 |
| 5,563,864 A * | 10/1996 | Kobayashi et al. | 369/59.22 |
| 6,804,695 B1 | 10/2004 | Hsu | |
| 7,379,408 B2 | 5/2008 | Tatsuzawa et al. | |
| 8,611,411 B2 | 12/2013 | Hayami et al. | |
| 8,922,934 B2 * | 12/2014 | Lu et al. | 360/65 |
| 2005/0213241 A1 * | 9/2005 | Cideciyan et al. | 360/65 |
| 2010/0046600 A1 * | 2/2010 | Zerbe et al. | 375/233 |
| 2010/0053793 A1 * | 3/2010 | Mathew et al. | 360/39 |
| 2011/0093517 A1 * | 4/2011 | Liu et al. | 708/207 |
| 2014/0268390 A1 * | 9/2014 | Lu et al. | 360/32 |
| 2014/0286385 A1 * | 9/2014 | Wilson et al. | 375/232 |

* cited by examiner

*Primary Examiner* — Tan X Dinh

(57) ABSTRACT

Embodiments are related to systems and methods for data processing, and more particularly to systems and methods for multi-dimensional signal equalization. In one case, a data processing system is discussed that includes: a first equalizer governed at least in part by a first coefficient; a second equalizer circuit governed at least in part by a second coefficient; and a constraint circuit operable to force a sum of at least the first coefficient and the second coefficient to equal a defined value.

20 Claims, 6 Drawing Sheets

US 9,524,748 B2

SYSTEMS AND METHODS FOR MULTI-DIMENSIONAL EQUALIZATION CONSTRAINT

FIELD OF THE INVENTION

Embodiments are related to systems and methods for data processing, and more particularly to systems and methods for multi-dimensional signal equalization.

BACKGROUND

Various storage access systems have been developed that include an ability to sense data previously stored on a storage medium. Such storage access systems generally include circuitry and/or software used to process a sensed signal from a storage medium, and to process the sensed data in an attempt to recover an originally written data set. In some cases, the sensed data exhibits a low signal to noise ratio making recovery of the originally written data set difficult. As the recording density becomes greater, recording track width becomes narrower which in turn reduces the aforementioned signal to noise ratio. To enhance signal to noise ratio, multiple readers with different offsets have been adopted in a given recording system. Data from these multiple readers may be processed using multi-dimensional signal processing. However, controlling multi-dimensional signal processing may be complex.

Hence, for at least the aforementioned reasons, there exists a need in the art for advanced systems and methods for data processing.

SUMMARY

Embodiments are related to systems and methods for data processing, and more particularly to systems and methods for multi-dimensional signal equalization.

Various embodiments of the present invention provide data processing systems that include: a first equalizer circuit, a second equalizer circuit, and a constraint circuit. Operation of the first equalizer circuit is governed at least in part by a first coefficient, and operation of the second equalizer circuit is governed at least in part by a second coefficient. The constraint circuit operable to force a sum of at least the first coefficient and the second coefficient to equal a defined value. Of note, while some embodiments discussed in this application utilize two equalizer circuits, other embodiments may use three or more equalizer circuits.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1:
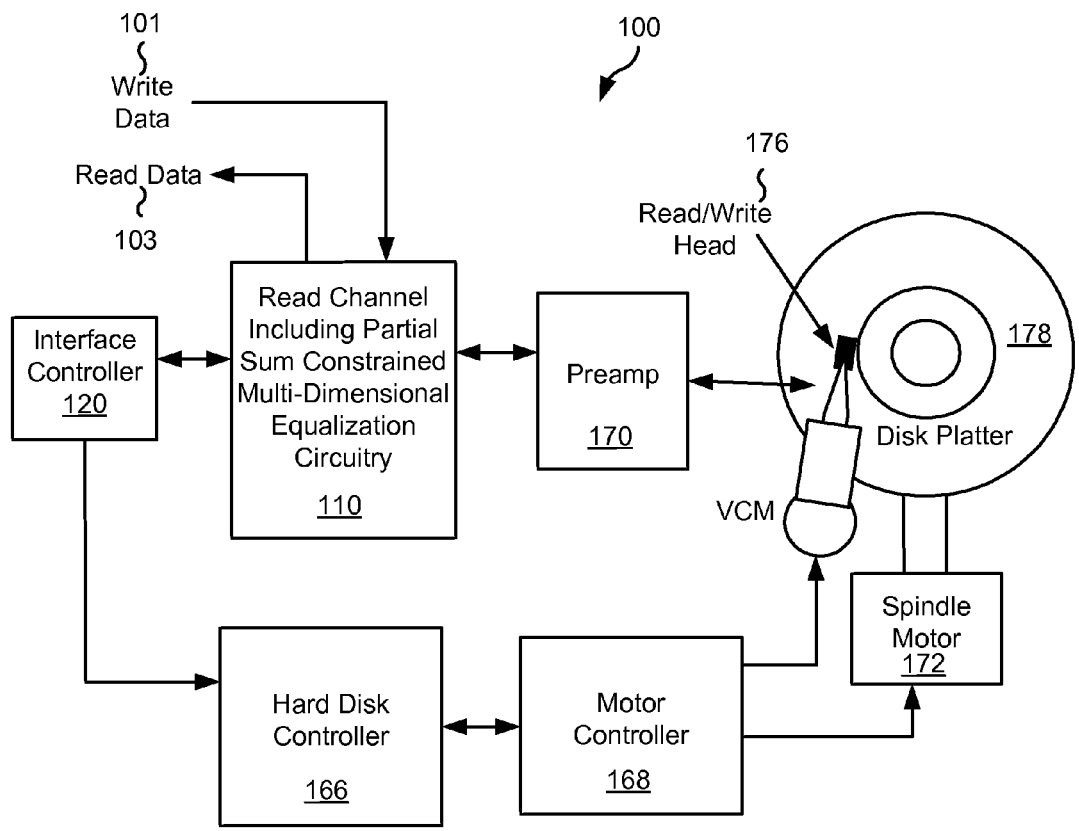
FIG. 1 shows a storage system including partial sum constrained multi-dimensional equalization circuitry in accordance with various embodiments of the present invention.

Embodiments are related to systems and methods for data processing, and more particularly to systems and methods for multi-dimensional signal equalization.

Various embodiments of the present invention provide data processing systems that include: a first equalizer circuit, a second equalizer circuit, and a constraint circuit. Operation of the first equalizer circuit is governed at least in part by a first coefficient, and operation of the second equalizer circuit is governed at least in part by a second coefficient. The constraint circuit operable to force a sum of at least the first coefficient and the second coefficient to equal a defined value. In some cases, the defined value is programmable. In some cases, the first coefficient is one of a number of coefficients governing operation of the first equalizer circuit, and the second coefficient is one of a number of coefficients governing operation of the second equalizer circuit.

In some instances of the aforementioned embodiments, operation of the first equalizer circuit is governed at least in part by a third coefficient and operation of the second equalizer circuit is governed at least in part by a fourth coefficient. In some such instances, the constraint circuit is incorporated as part of a coefficient adaptation circuit, and the coefficient adaptation circuit is operable to modify the third coefficient and the fourth coefficient while maintaining the sum of at least the first coefficient and the second coefficient equal to the defined value. In some cases, the defined value is programmable.

In various instances of the aforementioned embodiments, operation of the first equalizer circuit is further governed by a third coefficient, and operation of the second equalizer circuit is further governed by a fourth coefficient. In some such instances, the constraint circuit is further operable to force a sum of the first coefficient, the second coefficient, the third coefficient and the fourth coefficient to equal the defined value. In one or more instances of the aforementioned embodiments, operation of the first equalizer circuit is further governed by a third coefficient, a fourth coefficient and a fifth coefficient; and operation of the second equalizer circuit is further governed by a sixth coefficient, a seventh coefficient and an eighth coefficient. In some such instances, the constraint circuit is further operable to force a sum of the first coefficient, the second coefficient, the third coefficient, the fourth coefficient, the fifth coefficient, the sixth coefficient, the seventh coefficient, and the eighth coefficient to equal the defined value.

In some instances of the aforementioned embodiments, the system further includes a comparator circuit. The comparator circuit is operable to compare the sum with a threshold value. In some such instances, the constraint circuit does not force the sum of at least the first coefficient and the second coefficient equal to the defined value when the comparator circuit indicates that the sum is greater than a threshold value. In some cases, the threshold value is programmable. In one or more instances of the aforementioned embodiments, the system further includes a comparator circuit. The comparator circuit is operable to compare the sum with a threshold value. In some such instances, the constraint circuit does not force the sum of at least the first coefficient and the second coefficient equal to the defined value when the comparator circuit indicates that the sum is less than a threshold value. In some cases, the threshold value is programmable.

Other embodiments of the present invention provide methods for data processing that include: modifying a first coefficient value, a second coefficient value, a third coefficient value, and a fourth coefficient value based upon a feedback value; constraining the first coefficient value and the second coefficient value such that a sum of at least the first coefficient value and the second coefficient value equals a defined value; applying a first equalization algorithm by a first equalizer circuit guided by at least the first coefficient value and the third coefficient value to yield a first equalized output; applying a second equalization algorithm by a second equalizer circuit guided by at least the second coefficient value and the fourth coefficient value to yield a second equalized output, where the second coefficient value and the fourth coefficient value are only used by the second equalizer circuit and combining the first equalized output and the second equalized output to yield a common equalized output. In some cases, the second coefficient value and the fourth coefficient value are only used by the second equalizer circuit. In particular instances of the aforementioned embodiments, the feedback value is based at least in part on a processing output from one or both of downstream data decoder output, or a downstream data detector output.

In various instances of the aforementioned embodiments, the methods include constraining the first coefficient value, the second coefficient value, a fifth coefficient value, a sixth coefficient value, a seventh coefficient value, and an eighth coefficient value such that a sum of at the first coefficient value, the second coefficient value, the fifth coefficient value, the sixth coefficient value, the seventh coefficient value, and the eighth coefficient value equals the defined value. In some such instances, applying the first equalization algorithm by the first equalizer circuit is guided by at least the first coefficient value, the third coefficient value, the fifth coefficient value, and the seventh coefficient value; and applying the second equalization algorithm by the second equalizer circuit is guided by at least the second coefficient value, the fourth coefficient value, the sixth coefficient value, and the eighth coefficient value. In various cases, the methods further include: adding the first coefficient value, the second coefficient value, the fifth coefficient value, the sixth coefficient value, the seventh coefficient value, and the eighth coefficient value to yield a partial sum; and comparing the partial sum with a threshold value, where the result of the constraining is only enforced when the partial sum is greater than a first threshold or less than a second threshold, and wherein the first threshold is greater than the second threshold. In particular cases, one or more of the first threshold and the second threshold is/are programmable. In other cases, the first threshold and the second threshold are fixed. In some cases, the defined value is programmable. In other cases, the defined value is a fixed constant.

Turning to FIG. 1, a storage system 100 including a read channel circuit 110 having partial sum constrained multi-dimensional equalization circuitry in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

Data read from disk platter 178 is equalized using a multi-dimensional equalizer circuit. For example, in some cases read/writer head 176 may include multiple read sensors each providing an analog output, and the analog outputs are equalized using a multi-dimensional equalizer circuit to yield a common equalized output. In other cases, data from a single read sensor is equalized using a multi-dimensional equalizer circuit similar to that disclosed in U.S. patent Ser.

No. 13/853,695 entitled "Systems and Methods for Multi-Dimensional Signal Equalization" and filed Mar. 29, 2013. The entirety of the aforementioned reference is incorporated herein by reference for all purposes. In either case, the adaptation of the coefficients that govern operation of the multi-dimensional equalizer circuit may be constrained by forcing a partial sum of selected coefficients from each of the equalizers in the multi-dimensional equalizer circuit to be a defined value. In some cases, the partial sum constrained multi-dimensional equalization circuitry may be implemented similar to that discussed below in relation to one of FIG. 3, and the data processing including partial sum constrained equalization may be implemented similar to that discussed below in relation to FIGS. 4, 5 and 7.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platter 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
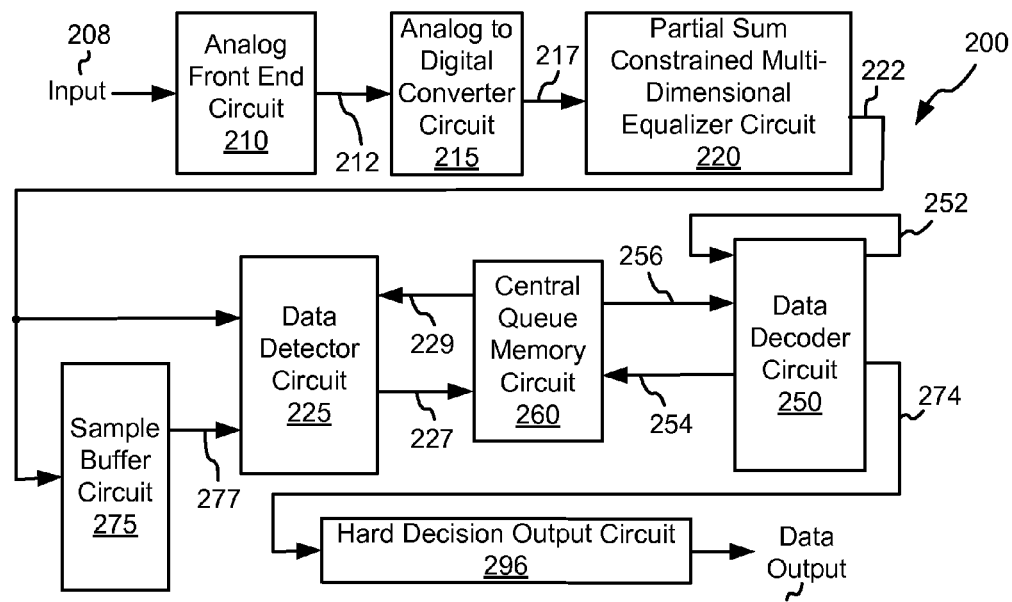
FIG. 2 shows a data processing circuit including a partial sum constrained multi-dimensional equalizer circuit in accordance with some embodiments of the present invention.

Turning to FIG. 2, a data processing circuit 200 is shown that includes a partial sum constrained multi-dimensional equalizer circuit 220 in accordance with some embodiments of the present invention. Data processing circuit 200 includes an analog front end circuit 210 that receives an analog signal 208. Analog front end circuit 210 processes analog signal 208 and provides a processed analog signal 212 to an analog to digital converter circuit 215. Analog front end circuit 210 may include, but is not limited to, an analog filter and an amplifier circuit as are known in the art. Based upon the disclosure provided herein, one of ordinary skill in the art will recognize a variety of circuitry that may be included as part of analog front end circuit 210. In some cases, analog input signal 208 is derived from a read/write head assembly (not shown) that is disposed in relation to a storage medium (not shown). In other cases, analog input signal 208 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input signal 208 may be derived.

Analog to digital converter circuit 215 converts processed analog signal 212 into a corresponding series of digital samples 217. Analog to digital converter circuit 215 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

Digital samples 217 are provided to partial sum constrained multi-dimensional equalizer circuit 220. Partial sum constrained multi-dimensional equalizer circuit 220 includes one, two or more equalizer circuits. Operation of the equalizer circuits is governed by coefficients provided to each of the equalizer circuits. The coefficients are adapted such that a partial sum of the coefficients across equalizers is fixed to a defined value. This cross-equalizer coefficient constraint reduces the complexity of coefficient adaptation, and yet provides sufficient performance. Digital samples 217 are equalized by partial sum constrained multi-dimensional equalizer circuit 220 to yield an equalized output 222. In some cases, the partial sum constrained multi-dimensional equalization circuit 220 may be implemented similar to that discussed below in relation to one of FIG. 3, and the data processing including partial sum constrained equalization circuit may be implemented similar to that discussed below in relation to FIGS. 4, 5 and 7.

Equalized output 222 is provided to both a data detector circuit 225 and a sample buffer circuit 275. Sample buffer circuit 275 includes sufficient memory to maintain one or more codewords until processing of that codeword is completed through data detector circuit 225 and a data decoder circuit 250 including, where warranted, multiple "global iterations" defined as passes through both data detector circuit 225 and data decoder circuit 250 and/or "local iterations" defined as passes through data decoding circuit 250 during a given global iteration. Sample buffer circuit 275 stores the received data as buffered data 277.

Data detector circuit 225 is a data detector circuit capable of producing a detected output 227 by applying a data detection algorithm to a data input. As some examples, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Data detector circuit 225 may provide both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 227 is provided to a central queue memory circuit 260 that operates to buffer data passed between data detector circuit 225 and data decoder circuit 250. When data decoder circuit 250 is available, data decoder circuit 250 receives detected output 227 from central queue memory 260 as a decoder input 256. Data decoder circuit 250 applies a data decoding algorithm to decoder input 256 in an attempt to recover originally written data. The result of the data decoding algorithm is provided as a decoded output 254. Similar to detected output 227, decoded output 254 may include both hard decisions and soft decisions. For example, data decoder circuit 250 may be any data decoder circuit known in the art that is capable of applying a decoding algorithm to a received input. Data decoder circuit 250 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 250 provides the result of the data decoding algorithm as a data output 274. Data output 274 is provided to a hard decision output circuit 296 where the data is reordered before providing a series of ordered data sets as a data output 298.

One or more iterations through the combination of data detector circuit 225 and data decoder circuit 250 may be made in an effort to converge on the originally written data set. As mentioned above, processing through both the data detector circuit and the data decoder circuit is referred to as a "global iteration". For the first global iteration, data detector circuit 225 applies the data detection algorithm without guidance from a decoded output. For subsequent global iterations, data detector circuit 225 applies the data detection algorithm to buffered data 277 as guided by decoded output 254. Decoded output 254 is received from central queue memory 260 as a detector input 229.

During each global iteration it is possible for data decoder circuit 250 to make one or more local iterations including application of the data decoding algorithm to decoder input 256. For the first local iteration, data decoder circuit 250 applies the data decoder algorithm without guidance from a decoded output 252. For subsequent local iterations, data decoder circuit 250 applies the data decoding algorithm to decoder input 256 as guided by a previous decoded output 252. In some embodiments of the present invention, a default of ten local iterations is allowed for each global iteration.

Figure 3:
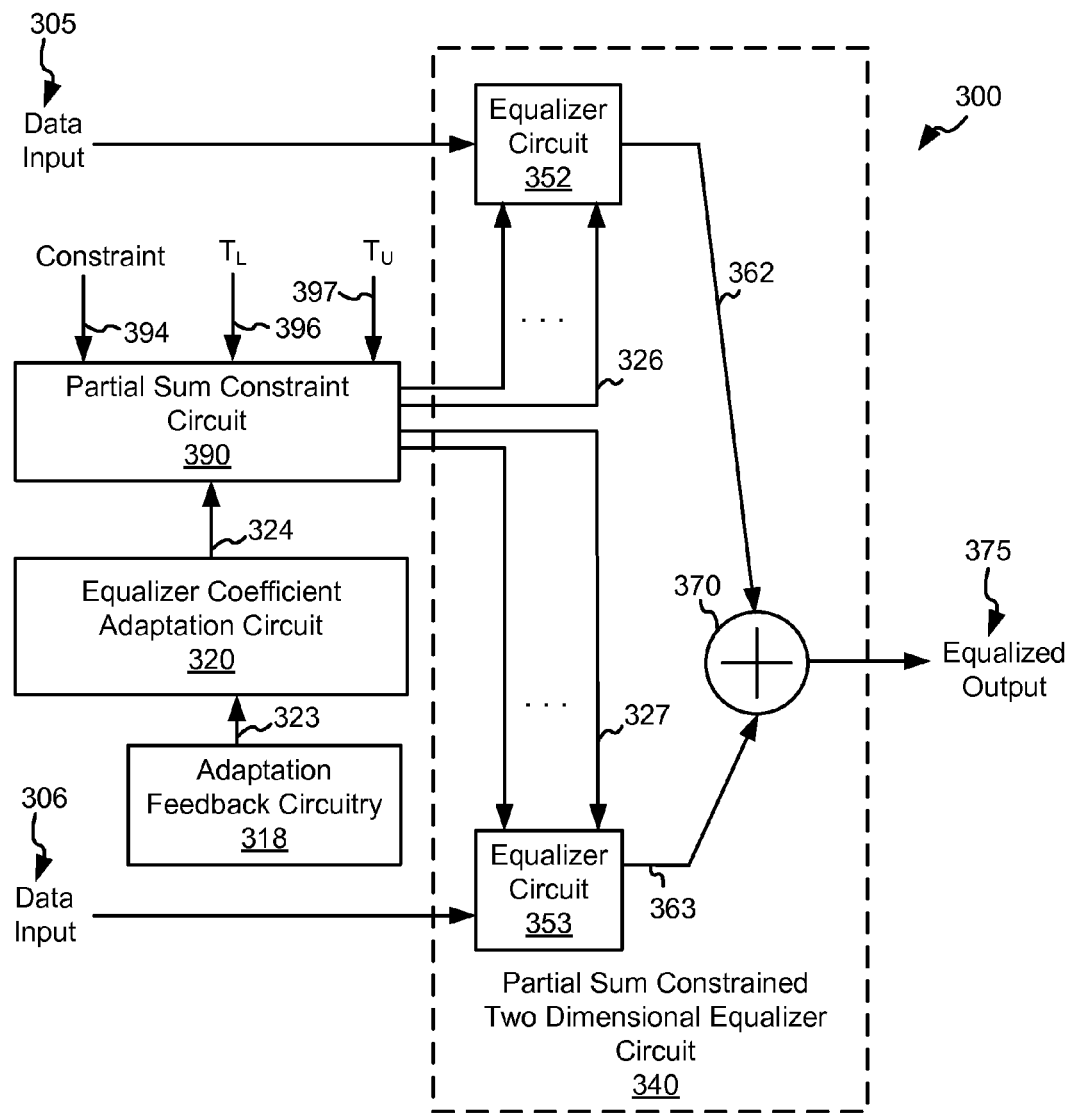
FIG. 3 shows one implementation of a two-dimensional equalization circuit including a partial sum constrained adaptation circuit in accordance with one or more embodiments of the present invention.

Turning to FIG. 3, one implementation of a two-dimensional equalization circuit 300 is shown that includes a partial sum constrained adaptation circuit including a partial sum constraint circuit 390 and an equalizer coefficient adaptation circuit 320 in accordance with one or more embodiments of the present invention. Two-dimensional equalization circuit 300 includes a partial sum constrained two-dimensional equalizer circuit 340. Partial sum constrained two-dimensional equalizer circuit 340 includes a first equalizer circuit 352 and a second equalizer circuit 353. First equalizer circuit 352 equalizes a data input 305 to yield a first equalized output 362; and second equalizer circuit 353 equalizes a data input 306 to yield a second equalized output 363. First equalized output 362 and second equalized output 363 are summed using a summation circuit 370 to yield an equalized output 375. In some cases, data input 306 is received from one read head (not shown) and corresponds to information sensed from a storage medium (not shown), and data input 305 is received from another read head (not shown) and corresponds to information sensed from the storage medium.

First equalizer circuit 352 and second equalizer circuit 353 may be any circuits known in the art that are capable of equalizing a data input based upon input coefficients 326, 327. In some embodiments of the present invention, both first equalizer circuit 352 and second equalizer circuit 353 are digital finite impulse response circuits as are known in the art. The operation of first equalizer circuit 352 is governed by coefficients 326, and second equalizer circuit 353 is governed by coefficients 327. In some embodiments, the number of coefficient values included in each of coefficients 326 and coefficients 327 is the same. In one such embodiment, the number of coefficient values is twelve.

Adaptation feedback circuitry 318 receives feedback from one or more circuits operating on equalized output 375 and provides a feedback output 323 based thereon. Feedback output 323 may be any feedback known in the art that can be used for adjusting equalizer coefficients. For example, the feedback output 323 may be an error value generated by comparing a result of a downstream data detection or data decoding process with an ideal output. Based upon the disclosure provided herein, one of ordinary skill in the art will recognize a variety of adaptation feedback that may be used in relation to different embodiments of the present invention.

An equalizer coefficient adaptation circuit 320 may be any equalizer coefficient adaptation circuit known in the art that is capable of adapting equalizer coefficients while maintaining one or more coefficients constrained. Equalizer coefficient adaptation circuit 320 applies a coefficient adaptation algorithm to previous coefficient values based upon feedback output 323 to yield preliminary coefficients 324 for equalizer circuit 352 and equalizer circuit 353. Preliminary coefficients 324 are provided to partial sum constraint circuit 390.

Partial sum constraint circuit 390 constrains one or more of the received preliminary coefficients 324, and the modified version of preliminary coefficients 324 is provided as coefficients 326 and coefficients 327. In one embodiment, partial sum constraint circuit 390 constrains one value ultimately included in each of coefficients 326 and coefficients 327 in accordance with the following equation:

$$f_n^1 + f_n^2 = K,$$

where K is a constraint input 394, $f_n^1$ is the $n^{th}$ coefficient of first equalizer circuit 352, and $f_n^2$ is the $n^{th}$ coefficient of second equalizer circuit 353. In some cases, the $n^{th}$ coefficient is selected as the dominant coefficient for one or both of the equalizer circuits. In various cases, the dominant coefficient in a twelve tap filter may be somewhere between the fifth and eight coefficient. In one particular embodiment of the present invention, the constrained coefficients ($f_n^1$ and $f_n^2$) are provided as coefficients 326 and coefficients 327. In one particular embodiment of the present invention, the aforementioned constraint is applied by partial sum constraint circuit by adding the following value to each of $f_n^1$ and $f_n^2$:

$$(K-f_n^1-f_n^2)/2.$$

In another embodiment, partial sum constraint circuit 390 constrains one value ultimately included in each of coefficients 326 and coefficients 327 in accordance with the following equation:

$$f_n^1+f_m^2=K,$$

where K is a constraint input 394, $f_n^1$ is the $n^{th}$ coefficient of first equalizer circuit 352, and $f_m^2$ is the $m^{th}$ coefficient of second equalizer circuit 353. In some cases, the $n^{th}$ coefficient is selected as the dominant coefficient for first equalizer circuit 352, and the $m^{th}$ coefficient is selected as the dominant coefficient for second equalizer circuit 353. In various cases, the dominant coefficient in a twelve tap filter may be somewhere between the fifth and eight coefficient. In one particular embodiment of the present invention, the constrained coefficients ($f_n^1$ and $f_m^2$) are provided as coefficients 326 and coefficients 327. In one particular embodiment of the present invention, the aforementioned constraint is applied by partial sum constraint circuit by adding the following value to each of $f_n^1$ and $f_m^2$:

$$(K-f_n^1-f_m^2)/2.$$

In other embodiments, partial sum constraint circuit 390 constrains two or more values ultimately included in each of coefficients 326 and coefficients 327 in accordance with the following general equation:

$$\sum_{i=n \ldots n+a} f_i^1 + \sum_{j=m \ldots m+a} f_j^2 = K.$$

In such a case, a may be a value between one and the total number of coefficient values less one. In one implementation, the aforementioned constraint is applied to the adaptation algorithm by adding the following value to each of $f_{n+1, n+2, \ldots, n+a}^1$ and $f_{m+1, m+2, \ldots, m+a}^2$:

$$(K-f_{n+1,n+2,\ldots,n+a}^1 - f_{m+1,m+2,\ldots,m+a}^2)/2a.$$

In some cases, the constraint is only applied by partial sum constraint circuit 390 when the partial sum of coefficients selected to be constrained exhibits a defined range of values as more fully discussed below in relation to FIG. 7. The defined range of values is based upon an upper threshold ($T_U$) 393 or a lower threshold ($T_L$) 392. In particular, where one coefficient value from each of coefficients 326, 327 is to be constrained, partial sum constraint circuit 390 applies a constraint only where one of the following conditions is met:

$$f_n^1+f_m^2 \leq T_L; \text{ or}$$

$$f_n^1+f_m^2 \geq T_U.$$

In the more general case where one or more values of coefficients 326, 327 are to be constrained, constraint is applied only where one of the following conditions is true:

$$\sum_{i=n \ldots n+a} f_i^1 + \sum_{j=m \ldots m+a} f_j^2 \leq T_L;$$

or $$\sum_{i=n \ldots n+a} f_i^1 + \sum_{j=m \ldots m+a} f_j^2 \geq T_U.$$

Figure 4:
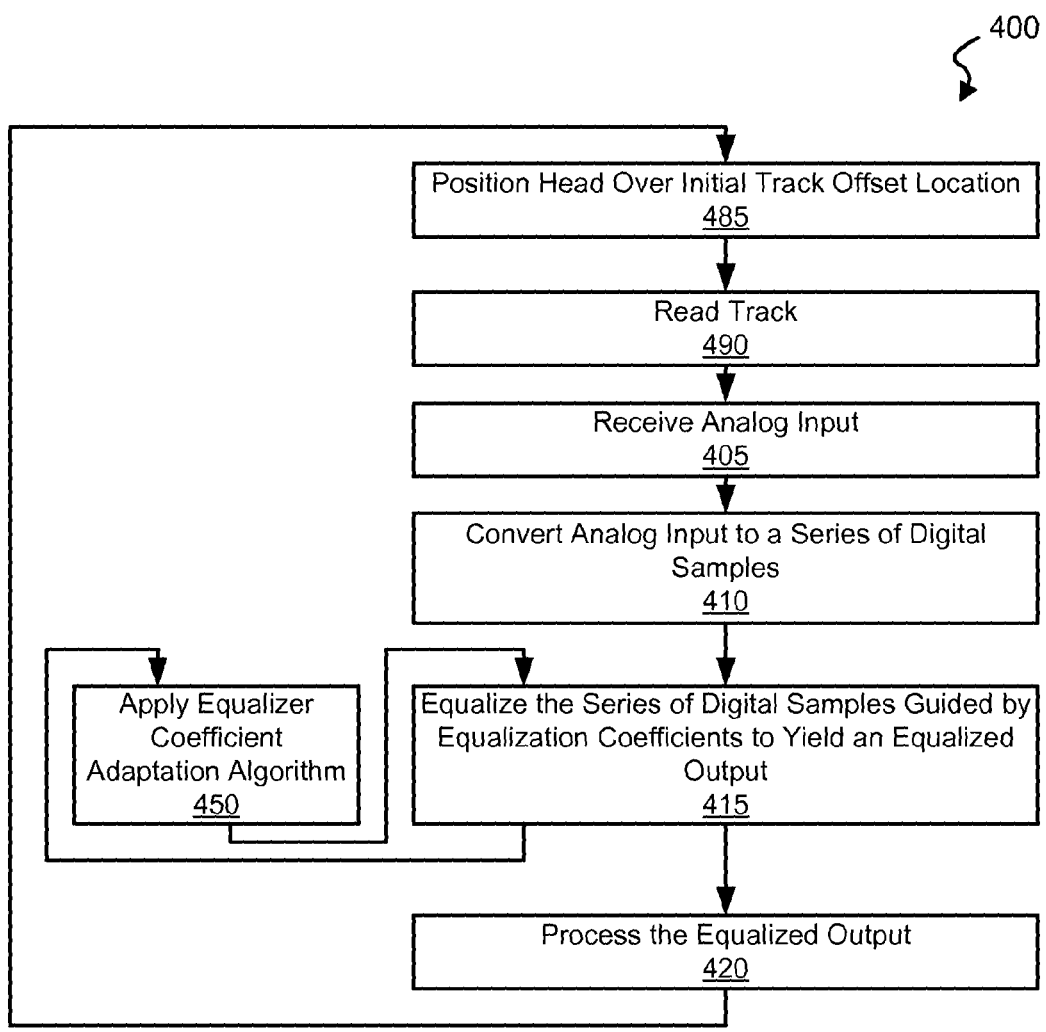
FIG. 4 is a flow diagram showing a general method for data processing including equalizer adaptation.

Turning to FIG. 4, a flow diagram 400 shows a general method for data processing including equalizer adaptation. Following flow diagram 400, a read/write head assembly is positioned at an initial track offset location (block 485), and the track is read (block 490). An analog input resulting from the reading of the track is received (block 405), and the analog input is converted to a series of corresponding digital samples (block 410).

A multi-dimensional equalization is applied to the series of digital samples to yield an equalized output (block 415). The multi-dimensional equalized output may be any multi-dimensional equalization process known in the art. In some cases, the multi-dimensional equalization may equalize data derived from two or more different sensors to yield a unified equalized output. In other cases, the multi-dimensional equalization may equalize data from a single read sensor using a multi-dimensional equalizer circuit similar to that disclosed in U.S. patent Ser. No. 13/853,695 entitled "Systems and Methods for Multi-Dimensional Signal Equalization" and filed Mar. 29, 2013. In either case, operation of the multiple equalizer circuits used to perform the multi-dimensional equalization is governed by coefficients provided to each of the equalizer circuits. The coefficients are adapted using an equalizer coefficient adaptation algorithm (block 450). The equalizer coefficient adaptation algorithm may be any algorithm known in the art for adapting equalizer coefficients that has been modified to constrain a partial sum of cross-equalizer coefficients in accordance with embodiments of the present invention. For example, where each of the equalizer circuits are twelve tap equalizers receiving twelve coefficient values, respectively, adaptation of the coefficient values for the equalizer circuits is constrained by forcing the sum of the sixth coefficient (i.e., a middle coefficient between coefficient one and coefficient twelve) for each of the equalizer circuits equal to a constant. Other examples of such partial sum equalization adaptation are more fully discussed below in relation to FIGS. 5-7.

The resulting equalized output is further processed (block 420). The additional processing may include, but is not limited to, application of a data detection algorithm and/or a data decoding algorithm to recover an original data set. Such data detection may include, but is not limited to, application of a Viterbi algorithm detection or a maximum a posteriori algorithm detection as are known in the art. Based upon the disclosure provided herein, one of ordinary skill in the art will recognize a variety of data detection algorithms that may be used in relation to different embodiments of the present invention. Such data decoding may be, but is not limited to, a low density parity check data decoding or a Reed Solomon decoding as are known in the art. Based upon the disclosure provided herein, one of ordinary skill in the art will recognize a variety of data decoding algorithms that may be used in relation to different embodiments of the present invention.

Figure 5:
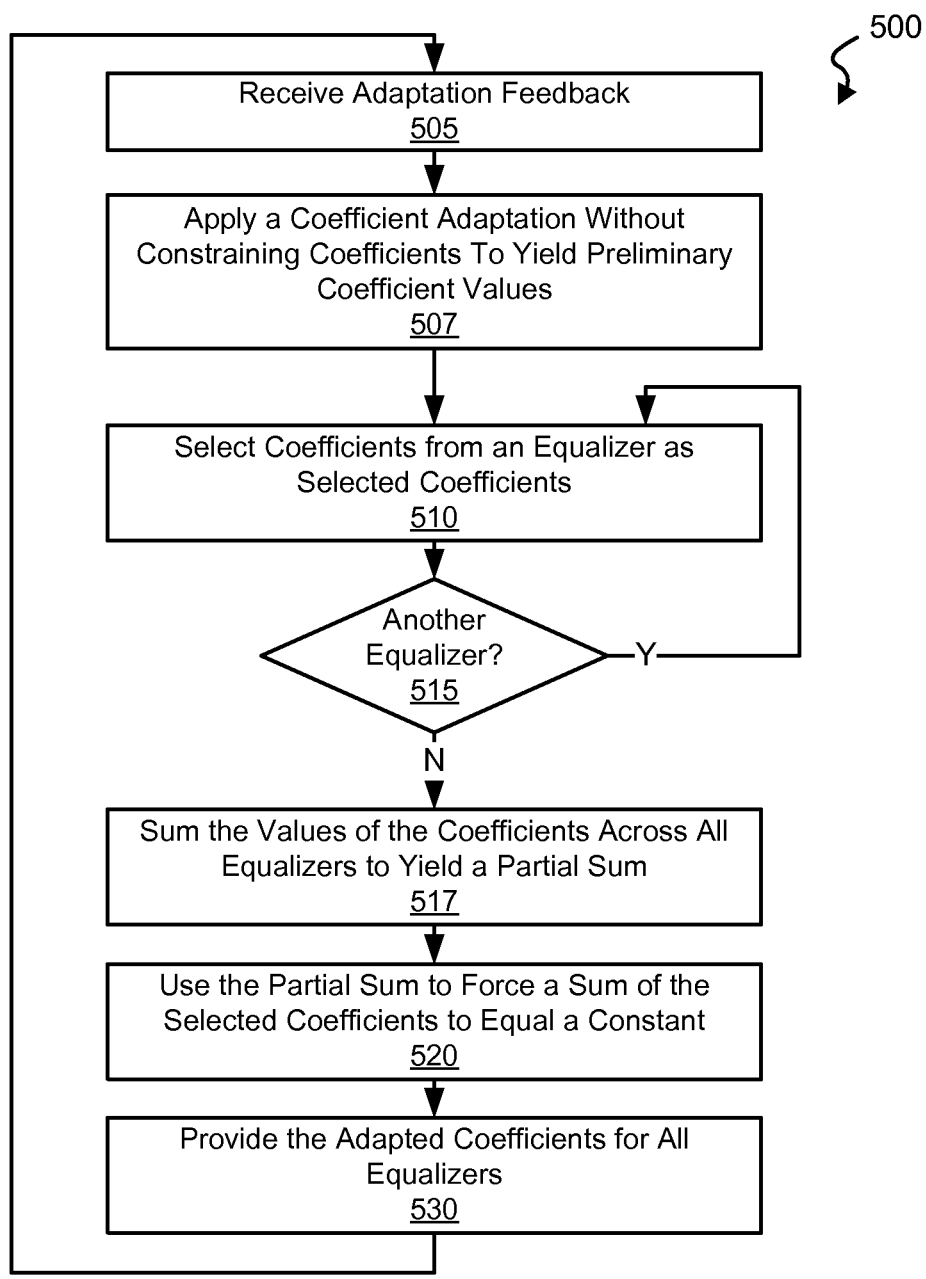
FIG. 5 is a flow diagram showing a method for partial sum constrained multi-dimensional equalizer adaptation in accordance with some embodiments of the present invention.

Turning to FIG. 5, a flow diagram 500 shows a method for partial sum constrained multi-dimensional equalizer adaptation in accordance with some embodiments of the present invention. Following flow diagram 500, adaptation feedback is received (block 505). The adaptation feedback may be any feedback known in the art that can be used for adjusting equalizer coefficients. For example, the adaptation feedback may be an error value generated by comparing a result of a downstream data detection or data decoding process with an ideal output. Based upon the disclosure provided herein, one of ordinary skill in the art will recognize a variety of adaptation feedback that may be used in relation to different embodiments of the present invention. Coefficient adaptation is applied without constraining any of the resulting coefficient values to yield preliminary coefficient values (block 507). Again, as mentioned above, any equalizer coefficient adaptation algorithm known in the art may be used to adapt the coefficient values to yield the preliminary coefficient values.

Figure 6A:
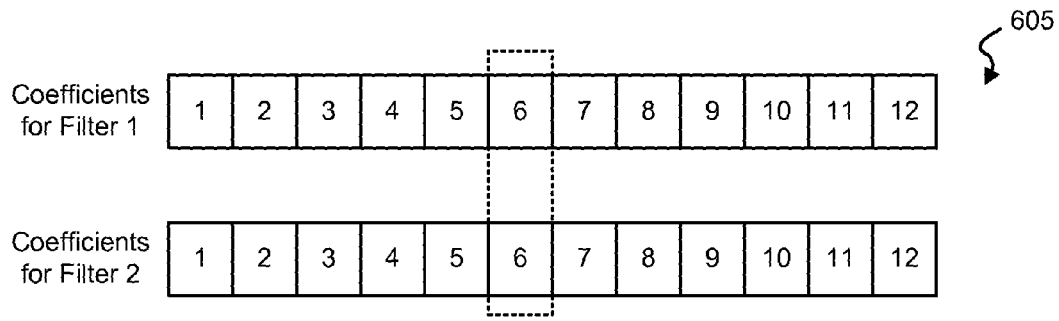
FIGS. 6a-6d graphically depict constrained coefficients that may be used in relation to one or more embodiments of the present invention.
Figure 6B:
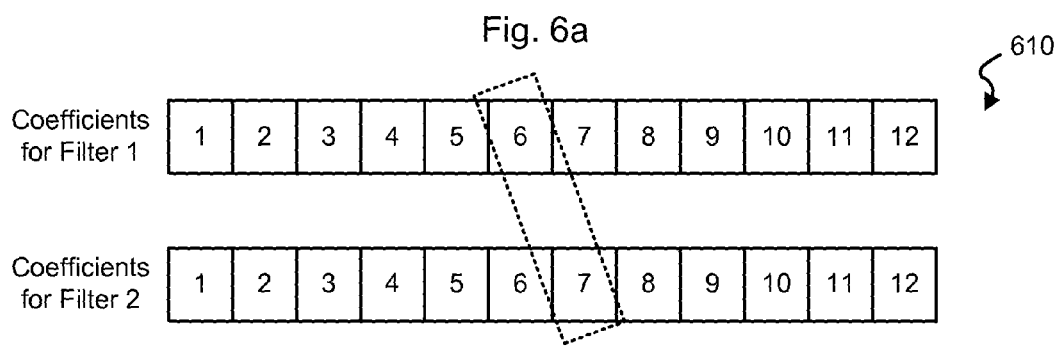
Figure 6C:
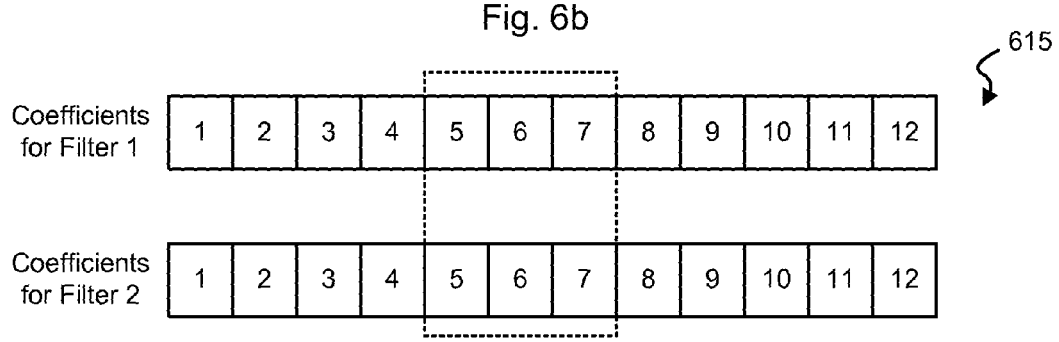
Figure 6D:
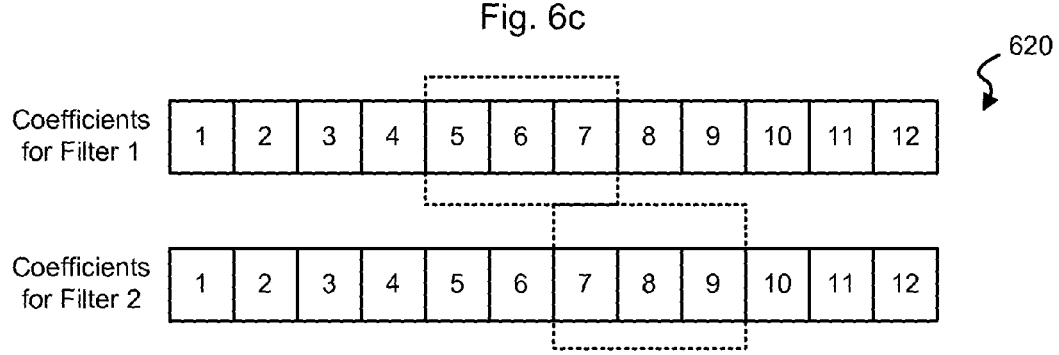

One or more of the preliminary coefficients from a first equalizer circuit are selected as selected coefficients (block 510). It is then determined whether another equalizer circuit is included in the multi-dimensional equalizer circuit (block 515). Where another equalizer circuit is included (block 515), the process of block 510 is repeated for the additional equalizer circuit with selection of the coefficients for the additional equalizer being incorporated into the selected coefficients for all equalizers. This process continues until all of the equalizers in the multi-dimensional equalizer circuit are considered. Where, for example, the multi-dimensional equalizer circuit includes two equalizer circuits, the selected coefficients will include at least one coefficient for each of the two equalizers. Turning to FIGS. 6a-6d, various examples of selected coefficients are shown in accordance with different embodiments of the present invention. FIG. 6a shows coefficients 605 for two twelve tap equalizer or filter circuits (labeled 1-12). The selected coefficients include the sixth coefficient for each of the two equalizer circuits as shown outlined by dashed lines. FIG. 6b shows another example of coefficients 610 where the sixth coefficient for one of the equalizers is selected and the seventh coefficient for the other equalizer is selected. Thus, the selected coefficients include the sixth coefficient for one equalizer circuit and the seventh coefficient for the other equalizer circuit as outlined by dashed lines. FIG. 6c shows another example of coefficients 615 where the fifth, sixth and seventh coefficients for one of the equalizers are selected and the fifth, sixth and seventh coefficients for the other equalizer is selected. Thus, the selected coefficients include the fifth, sixth and seventh coefficients for both of the equalizer circuits as outlined by dashed lines. FIG. 6d shows another example of coefficients 620 where the fifth, sixth and seventh coefficients for one of the equalizers are selected and the seventh, eighth and ninth coefficients for the other equalizer is selected. Thus, the selected coefficients include the fifth, sixth and seventh coefficients for one equalizer circuit and the seventh, eighth and ninth coefficients for the other equalizer circuit as outlined by dashed lines.

Returning to FIG. 5, once coefficients for each of the equalizer circuits have been incorporated into the selected coefficients (block 515), all of the selected coefficients across all of the equalizers are summed to yield a partial sum (block 517). Using this partial sum, the selected coefficient values are modified to force the sum of the selected coefficients to equal a constant (block 520), and the resulting adapted coefficients are provided to the respective equalizer circuits to be used in governing the operation of the respective equalizer circuit (block 530). Thus, for example, where the selected coefficients are similar to that shown in FIG. 6a, the selected coefficients are each modified so that the constraint in accordance with the following equation is met:

$$f_n^1 + f_n^2 = K,$$

where K is a constant, $f_n^1$ is the $n^{th}$ coefficient of the first equalizer, and $f_n^2$ is the $n^{th}$ coefficient of the second equalizer. In some cases, the $n^{th}$ coefficient is selected as the dominant coefficient for one or both of the equalizer circuits. In various cases, the dominant coefficient in a twelve tap filter my be somewhere between the fifth and eight coefficient. In one implementation, the aforementioned constraint is applied to the adaptation algorithm by adding the following value to each of $f_n^1$ and $f_n^2$:

$$(K - f_n^1 - f_n^2)/2.$$

This is the partial sum $(f_n^1 + f_n^2)$ subtracted from the constant (K) with a portion (i.e., one half) being added to each of the two selected coefficients $(f_n^1, f_n^2)$ to yield the modified coefficients.

As another example, where the selected coefficients are similar to that shown in FIG. 6b, the selected coefficients are constrained in accordance with the following equation:

$$f_n^1 + f_m^2 = K,$$

where K is a constant, $f_n^1$ is the $n^{th}$ coefficient of the first equalizer, and $f_m^2$ is the $m^{th}$ coefficient of the second equalizer. In some cases, the $n^{th}$ coefficient is selected as the dominant coefficient for the first equalizer circuit, and the $m^{th}$ coefficient is selected as the dominant coefficient for the second equalizer circuit. Again, in various cases, the dominant coefficient in a twelve tap filter my be somewhere between the fifth and eight coefficient. In one implementation, the aforementioned constraint is applied to the adaptation algorithm by adding the following value to each of $f_n^1$ and $f_m^2$:

$$(K - f_n^1 - f_n^2)/2.$$

This is the partial sum $(f_n^1 + f_m^2)$ subtracted from the constant (K) with a portion (i.e., one half) being added to each of the two selected coefficients $(f_n^1, f_m^2)$ to yield the modified coefficients.

As yet a another example, where the selected coefficients are similar to that shown in FIG. 6c, the selected coefficients are constrained in accordance with the following equation:

$$f_n^1 + f_{n+1}^1 + f_{n+2}^1 + f_n^2 + f_{n+1}^2 + f_{n+2}^2 = K,$$

where K is a constant, the coefficients $f_n^1, f_{n+1}^1, f_{n+2}^1$ are the three coefficients beginning with the $n^{th}$ coefficient of the first equalizer, and $f_n^2, f_{n+1}^2, f_{n+2}^2$ are the three coefficients beginning with the $n^{th}$ coefficient of the second equalizer. In some cases, the three coefficients beginning with the $n^{th}$ coefficient are selected as the most dominant coefficients for the first equalizer circuit, and the three coefficients beginning with the $n^{th}$ coefficient are selected as the most dominant coefficients for the second equalizer circuit. Again, in various cases, the dominant coefficient in a twelve tap filter my be somewhere between the fifth and eight coefficient. In one implementation, the aforementioned constraint is applied to the adaptation algorithm by adding the following value to each of $f_n^1, f_{n+1}^1, f_{n+2}^1, f_n^2, f_{n+1}^2$, and $f_{n+2}^2$:

$$(K - f_n^1 - f_{n+1}^1 - f_{n+2}^1 - f_n^2 - f_{n+1}^2 - f_{n+2}^2)/6.$$

This is the partial sum $(f_n^1 + f_{n+1}^1 + f_{n+2}^1 + f_n^2 + f_{n+1}^2 + f_{n+2}^2)$ subtracted from the constant (K) with a portion (i.e., one sixth) being added to each of the six selected coefficients ($f_n^1$, $f_{n+1}^1$, $f_{n+2}^1$, $f_n^2$, $f_{n+1}^2$, $f_{n+2}^2$) to yield the modified coefficients.

As yet a further example, where the selected coefficients are similar to that shown in FIG. 6d, the selected coefficients are constrained in accordance with the following equation:

$$f_n^1 + f_{n+1}^1 + f_{n+2}^1 + f_m^2 + f_{m+1}^2 + f_{m+2}^2 = K,$$

where K is a constant, the coefficients $f_n^1$, $f_{n+1}^1$, $f_{n+2}^1$ are the three coefficients beginning with the $n^{th}$ coefficient of the first equalizer, and $f_m^2$, $f_{m+1}^2$, $f_{m+2}^2$ are the three coefficients beginning with the $m^{th}$ coefficient of the second equalizer. In some cases, the three coefficients beginning with the $n^{th}$ coefficient are selected as the most dominant coefficients for the first equalizer circuit, and the three coefficients beginning with the $m^{th}$ coefficient are selected as the most dominant coefficients for the second equalizer circuit. Again, in various cases, the dominant coefficient in a twelve tap filter my be somewhere between the fifth and eight coefficient. In one implementation, the aforementioned constraint is applied to the adaptation algorithm by adding the following value to each of $f_n^1$, $f_{n+1}^1$, $f_{n+2}^1$, $f_m^2$, $f_{m+1}^2$, and $f_{m+2}^2$:

$$(K - f_n^1 - f_{n+1}^1 - f_{n+2}^1 - f_m^2 - f_{m+1}^2 - f_{m+2}^2)/6.$$

A more generalized approach may constrain the selected coefficients in accordance with the following equation:

$$\sum_{i=n \ldots n+a} f_i^1 + \sum_{j=m \ldots m+a} f_j^2 = K.$$

In one implementation, the aforementioned constraint is applied to the adaptation algorithm by adding the following value to each of $f_{n+1, n+2, \ldots, n+a}^1$ and $f_{m+1, m+2, \ldots, m+a}^2$:

$$(K - f_{n+1, n+2, \ldots, n+a}^1 - f_{m+1, m+2, \ldots, m+a}^2)/2a.$$

Figure 7:
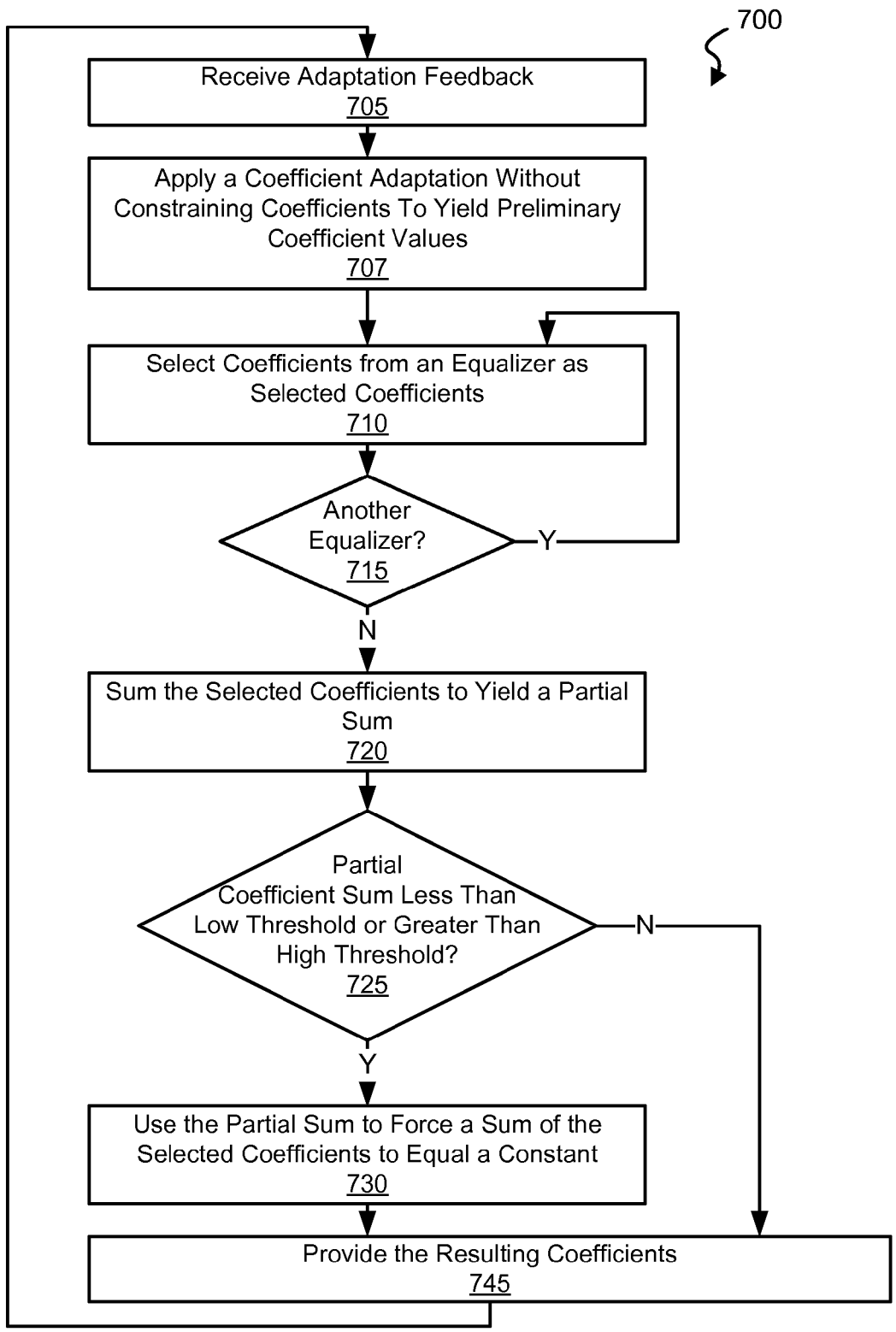
FIG. 7 is a flow diagram showing a method for selective partial sum constrained multi-dimensional equalizer adaptation in accordance with various embodiments of the present invention.

Turning to FIG. 7, a flow diagram 700 shows a method for selective partial sum constrained multi-dimensional equalizer adaptation in accordance with some embodiments of the present invention. Following flow diagram 700, adaptation feedback is received (block 705). The adaptation feedback may be any feedback known in the art that can be used for adjusting equalizer coefficients. For example, the adaptation feedback may be an error value generated by comparing a result of a downstream data detection or data decoding process with an ideal output. Based upon the disclosure provided herein, one of ordinary skill in the art will recognize a variety of adaptation feedback that may be used in relation to different embodiments of the present invention. Coefficient adaptation is applied without constraining any of the resulting coefficient values to yield preliminary coefficient values (block 707). Again, as mentioned above, any equalizer coefficient adaptation algorithm known in the art may be used to adapt the coefficient values to yield the preliminary coefficient values.

One or more of the preliminary coefficients from a first equalizer circuit are selected as selected coefficients (block 710). It is then determined whether another equalizer circuit is included in the multi-dimensional equalizer circuit (block 715). Where another equalizer circuit is included (block 715), the process of block 710 is repeated for the additional equalizer circuit with selection of the coefficients for the additional equalizer being incorporated into the selected coefficients for all equalizers. This process continues until all of the equalizers in the multi-dimensional equalizer circuit are considered. Where, for example, the multi-dimensional equalizer circuit includes two equalizer circuits, the selected coefficients will include at least one coefficient for each of the two equalizers. Turning to FIGS. 6a-6d, various examples of selected coefficients are shown in accordance with different embodiments of the present invention. FIG. 6a shows coefficients 605 for two twelve tap equalizer or filter circuits (labeled 1-12). The selected coefficients include the sixth coefficient for each of the two equalizer circuits as shown outlined by dashed lines. FIG. 6b shows another example of coefficients 610 where the sixth coefficient for one of the equalizers is selected and the seventh coefficient for the other equalizer is selected. Thus, the selected coefficients include the sixth coefficient for one equalizer circuit and the seventh coefficient for the other equalizer circuit as outlined by dashed lines. FIG. 6c shows another example of coefficients 615 where the fifth, sixth and seventh coefficients for one of the equalizers are selected and the fifth, sixth and seventh coefficients for the other equalizer is selected. Thus, the selected coefficients include the fifth, sixth and seventh coefficients for both of the equalizer circuits as outlined by dashed lines. FIG. 6d shows another example of coefficients 620 where the fifth, sixth and seventh coefficients for one of the equalizers are selected and the seventh, eighth and ninth coefficients for the other equalizer is selected. Thus, the selected coefficients include the fifth, sixth and seventh coefficients for one equalizer circuit and the seventh, eighth and ninth coefficients for the other equalizer circuit as outlined by dashed lines.

Returning to FIG. 7, once coefficients for each of the equalizer circuits have been incorporated into the selected coefficients (block 715), the selected coefficients are summed together to yield a partial sum (block 720). It is determined whether the partial sum is less than a lower threshold or greater than an upper threshold (block 725). In some cases, the upper threshold and/or the lower threshold are user programmable. In other cases, one or both of the upper threshold or the lower threshold are fixed. Where the partial sum is either less than a lower threshold or greater than an upper threshold (block 725), the selected coefficient values are modified using the partial sum to force the sum of the selected coefficients to equal a constant (block 730), and the resulting adapted coefficients are provided to the respective equalizer circuits to be used in governing the operation of the respective equalizer circuit (block 745). Thus, for example, where the selected coefficients are similar to that shown in FIG. 6a, the selected coefficients are constrained in accordance with the following equation:

$$f_n^1 + f_n^2 = K,$$

where K is a constant, $f_n^1$ is the $n^{th}$ coefficient of the first equalizer, and $f_n^2$ is the $n^{th}$ coefficient of the second equalizer. In some cases, the $n^{th}$ coefficient is selected as the dominant coefficient for one or both of the equalizer circuits. In various cases, the dominant coefficient in a twelve tap filter my be somewhere between the fifth and eight coefficient. In one implementation, the aforementioned constraint is applied to the adaptation algorithm by adding the following value to each of $f_n^1$ and $f_n^2$:

$$(K - f_n^1 - f_n^2)/2.$$

This is the partial sum ($f_n^1 + f_n^2$) subtracted from the constant (K) with a portion (i.e., one half) being added to each of the two selected coefficients ($f_n^1$, $f_n^2$) to yield the modified coefficients.

As another example, where the selected coefficients are similar to that shown in FIG. 6b, the selected coefficients are constrained in accordance with the following equation:

$$f_n^1 + f_m^2 = K,$$

where K is a constant, $f_n^1$ is the $n^{th}$ coefficient of the first equalizer, and $f_m^2$ is the $m^{th}$ coefficient of the second equalizer. In some cases, the $n^{th}$ coefficient is selected as the dominant coefficient for the first equalizer circuit, and the $m^{th}$ coefficient is selected as the dominant coefficient for the second equalizer circuit. Again, in various cases, the dominant coefficient in a twelve tap filter my be somewhere between the fifth and eight coefficient. In one implementation, the aforementioned constraint is applied to the adaptation algorithm by adding the following value to each of $f_n^1$ and $f_m^2$:

$$(K - f_n^1 - f_m^2)/2.$$

This is the partial sum ($f_n^1 + f_m^2$) subtracted from the constant (K) with a portion (i.e., one half) being added to each of the two selected coefficients ($f_n^1$, $f_m^2$) to yield the modified coefficients.

As yet a another example, where the selected coefficients are similar to that shown in FIG. 6c, the selected coefficients are constrained in accordance with the following equation:

$$f_n^1 + f_{n+1}^1 + f_{n+2}^1 + f_n^2 + f_{n+1}^2 + f_{n+2}^2 = K,$$

where K is a constant, the coefficients $f_n^1$, $f_{n+1}^1$, $f_{n+2}^1$ are the three coefficients beginning with the $n^{th}$ coefficient of the first equalizer, and $f_n^2$, $f_{n+1}^2$, $f_{n+2}^2$ are the three coefficients beginning with the $n^{th}$ coefficient of the second equalizer. In some cases, the three coefficients beginning with the $n^{th}$ coefficient are selected as the most dominant coefficients for the first equalizer circuit, and the three coefficients beginning with the $n^{th}$ coefficient are selected as the most dominant coefficients for the second equalizer circuit. Again, in various cases, the dominant coefficient in a twelve tap filter my be somewhere between the fifth and eight coefficient. In one implementation, the aforementioned constraint is applied to the adaptation algorithm by adding the following value to each of $f_n^1$, $f_{n+1}^1$, $f_{n+2}^1$, $f_n^2$, $f_{n+1}^2$, and $f_{n+2}^2$:

$$(K - f_n^1 - f_{n+1}^1 - f_{n+2}^1 - f_n^2 - f_{n+1}^2 - f_{n+2}^2)/6.$$

This is the partial sum ($f_n^1 + f_{n+1}^1 + f_{n+2}^1 + f_n^2 + f_{n+1}^2 + f_{n+2}^2$) subtracted from the constant (K) with a portion (i.e., one sixth) being added to each of the six selected coefficients ($f_n^1$, $f_{n+1}^1$, $f_{n+2}^1$, $f_n^2$, $f_{n+1}^2$, $f_{n+2}^2$) to yield the modified coefficients.

As yet a further example, where the selected coefficients are similar to that shown in FIG. 6d, the selected coefficients are constrained in accordance with the following equation:

$$f_n^1 + f_{n+1}^1 + f_{n+2}^1 + f_m^2 + f_{m+1}^2 + f_{m+2}^2 = K,$$

where K is a constant, the coefficients $f_n^1$, $f_{n+1}^1$, $f_{n+2}^1$ are the three coefficients beginning with the $n^{th}$ coefficient of the first equalizer, and $f_m^2$, $f_{m+1}^2$, $f_{m+2}^2$ are the three coefficients beginning with the $m^{th}$ coefficient of the second equalizer. In some cases, the three coefficients beginning with the $n^{th}$ coefficient are selected as the most dominant coefficients for the first equalizer circuit, and the three coefficients beginning with the $m^{th}$ coefficient are selected as the most dominant coefficients for the second equalizer circuit. Again, in various cases, the dominant coefficient in a twelve tap filter my be somewhere between the fifth and eight coefficient. In one implementation, the aforementioned constraint is applied to the adaptation algorithm by adding the following value to each of $f_n^1$, $f_{n+1}^1$, $f_{n+2}^1$, $f_m^2$, $f_{m+1}^2$, and $f_{m+2}^2$:

$$(K - f_n^1 - f_{n+1}^1 - f_{n+2}^1 - f_m^2 - f_{m+1}^2 - f_{m+2}^2)/6.$$

A more generalized approach may constrain the selected coefficients in accordance with the following equation:

$$\sum_{i=n \ldots n+a} f_i^1 + \sum_{j=m \ldots m+a} f_j^2 = K.$$

In one implementation, the aforementioned constraint is applied to the adaptation algorithm by adding the following value to each of $f_{n+1, n+2, \ldots, n+a}^1$ and $f_{m+1, m+2, \ldots, m+a}^2$:

$$(K - f_{n+1,n+2,\ldots,n+a}^1 - f_{m+1,m+2,\ldots,m+a}^2)/2a.$$

Alternatively, where the partial sum is neither less than the lower threshold nor greater than the upper threshold (block 725), no constraint is applied to the preliminary coefficient values, but rather the preliminary coefficient values are provided as the resulting coefficients to the respective equalizer circuits to be used in governing the operation of the respective equalizer circuit (block 745).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent, albeit such a system would not be a circuit. In other cases, the one part of a given system, block or circuit may be implemented in software or firmware, while other parts are implemented in hardware.

In conclusion, the invention provides novel systems, devices, methods and arrangements for out of order data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
   a first equalizer circuit, wherein operation of the first equalizer circuit is governed at least in part by a first coefficient;
   a second equalizer circuit, wherein operation of the second equalizer circuit is governed at least in part by a second coefficient; and
   a constraint circuit operable to force a sum of at least the first coefficient and the second coefficient to equal a defined value.

2. The system of claim 1, wherein operation of the first equalizer circuit is governed at least in part by a third coefficient and operation of the second equalizer circuit is governed at least in part by a fourth coefficient, wherein the constraint circuit is incorporated as part of a coefficient adaptation circuit, and wherein the coefficient adaptation circuit is operable to modify the third coefficient and the fourth coefficient while maintaining the sum of at least the first coefficient and the second coefficient equal to the defined value.

3. The system of claim 1, wherein the defined value is programmable.

4. The system of claim 1, wherein operation of the first equalizer circuit is further governed by a third coefficient, wherein operation of the second equalizer circuit is further governed by a fourth coefficient, and wherein the constraint circuit is further operable to force a sum of the first coefficient, the second coefficient, the third coefficient and the fourth coefficient to equal the defined value.

5. The system of claim 1, wherein operation of the first equalizer circuit is further governed by a third coefficient, a fourth coefficient and a fifth coefficient; wherein operation of the second equalizer circuit is further governed by a sixth coefficient, a seventh coefficient and an eighth coefficient, and wherein the constraint circuit is further operable to force a sum of the first coefficient, the second coefficient, the third coefficient, the fourth coefficient, the fifth coefficient, the sixth coefficient, the seventh coefficient, and the eighth coefficient to equal the defined value.

6. The system of claim 1, the system further comprising:
a comparator circuit operable to compare the sum with a threshold value; and
wherein the constraint circuit does not force the sum of at least the first coefficient and the second coefficient equal to the defined value when the comparator circuit indicates that the sum is greater than a threshold value.

7. The system of claim 6, wherein the threshold value is programmable.

8. The system of claim 1, the system further comprising:
a comparator circuit operable to compare the sum with a threshold value; and
wherein the constraint circuit does not force the sum of at least the first coefficient and the second coefficient equal to the defined value when the comparator circuit indicates that the sum is less than a threshold value.

9. The system of claim 8, wherein the threshold value is programmable.

10. The system of claim 1, wherein the system is implemented as part of an integrated circuit.

11. The system of claim 1, wherein the system is implemented as part of a storage device.

12. The system of claim 11, wherein the storage device comprises:
a storage medium; and
a read/write head assembly disposed in relation to the storage medium.

13. A method for data processing, the method comprising:
modifying a first coefficient value, a second coefficient value, a third coefficient value, and a fourth coefficient value based upon a feedback value;
constraining the first coefficient value and the second coefficient value such that a sum of at least the first coefficient value and the second coefficient value equals a defined value;
applying a first equalization algorithm by a first equalizer circuit guided by at least the first coefficient value and the third coefficient value to yield a first equalized output;
applying a second equalization algorithm by a second equalizer circuit guided by at least the second coefficient value and the fourth coefficient value to yield a second equalized output, wherein the second coefficient value and the fourth coefficient value are only used by the second equalizer circuit; and
combining the first equalized output and the second equalized output to yield a common equalized output.

14. The method of claim 13, wherein the feedback value is based at least in part on a processing output selected from a group consisting of: a data decoder output, and a data detector output.

15. The method of claim 13, the method further comprising:
constraining the first coefficient value, the second coefficient value, a fifth coefficient value, and a sixth coefficient value such that a sum of at the first coefficient value, the second coefficient value, the fifth coefficient value, and the sixth coefficient value equals the defined value;
wherein applying the first equalization algorithm by the first equalizer circuit is guided by at least the first coefficient value, the third coefficient value, and the fifth coefficient value; and
wherein applying the second equalization algorithm by the second equalizer circuit is guided by at least the second coefficient value, the fourth coefficient value, and the sixth coefficient value.

16. The method of claim 13, the method further comprising:
constraining the first coefficient value, the second coefficient value, a fifth coefficient value, a sixth coefficient value, a seventh coefficient value, and an eighth coefficient value such that a sum of at the first coefficient value, the second coefficient value, the fifth coefficient value, the sixth coefficient value, the seventh coefficient value, and the eighth coefficient value equals the defined value;
wherein applying the first equalization algorithm by the first equalizer circuit is guided by at least the first coefficient value, the third coefficient value, the fifth coefficient value, and the seventh coefficient value; and
wherein applying the second equalization algorithm by the second equalizer circuit is guided by at least the second coefficient value, the fourth coefficient value, the sixth coefficient value, and the eighth coefficient value.

17. The method of claim 16, wherein the method further comprises:
adding the first coefficient value, the second coefficient value, the fifth coefficient value, the sixth coefficient value, the seventh coefficient value, and the eighth coefficient value to yield a partial sum; and
comparing the partial sum with a threshold value, wherein the result of the constraining is only enforced when the partial sum is greater than a first threshold or less than a second threshold, and wherein the first threshold is greater than the second threshold.

18. The method of claim 17, wherein the first threshold and the second threshold are programmable.

19. The method of claim 13, wherein the defined value is programmable.

20. A data processing system, the system comprising:
a first means for equalizing data using at least a first coefficient;
a second means for equalizing data using at least a second coefficient, wherein the second coefficient is only used by the second means for equalizing; and
a means for constraining the first coefficient and the second coefficient such that a sum of the first coefficient and the second coefficient equals a constant.

* * * * *